(12) United States Patent
Munagala et al.

(10) Patent No.: US 12,417,189 B2
(45) Date of Patent: Sep. 16, 2025

(54) AUTOMATED DAMAGE CONDITION DETECTION AND DATA BACKUP IN AN ELECTRONIC DEVICE

(71) Applicant: QUALCOMM Incorporated, San Diego, CA (US)

(72) Inventors: Hari Krishna Munagala, Giddalur (IN); Ravinder Are, Hyderabad (IN); Rajeevalochana R, Hyderabad (IN); Utkarsh Verma, Lucknow (IN); Praveen Kandukuri, Chilakaluripet (IN); Hargovind Prasad Bansal, Bharatpur (IN)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 18/492,101

(22) Filed: Oct. 23, 2023

(65) Prior Publication Data
US 2025/0130957 A1   Apr. 24, 2025

(51) Int. Cl.
*G06F 12/14* (2006.01)
*G06F 11/14* (2006.01)
*G06F 12/02* (2006.01)

(52) U.S. Cl.
CPC ...... *G06F 12/1425* (2013.01); *G06F 11/1451* (2013.01); *G06F 12/0246* (2013.01)

(58) Field of Classification Search
None
See application file for complete search history.

(56) References Cited

U.S. PATENT DOCUMENTS

| | | | | |
|---|---|---|---|---|
| 7,487,391 B2* | 2/2009 | Pecone | ........ | G06F 1/30 714/14 |
| 2002/0030914 A1* | 3/2002 | Ito | ........ | G11B 5/012 711/E12.019 |
| 2006/0184827 A1* | 8/2006 | Robinson | ........ | G06F 11/1441 714/E11.138 |
| 2007/0180207 A1* | 8/2007 | Garfinkle | ........ | G06F 11/1469 340/5.74 |
| 2016/0098309 A1 | 4/2016 | Kim | | |
| 2016/0224099 A1* | 8/2016 | Shen | ........ | G06F 1/3287 |
| 2017/0060694 A1* | 3/2017 | Makhov | ........ | G06F 16/113 |
| 2017/0177449 A1* | 6/2017 | Bronk | ........ | H04W 4/70 |
| 2018/0349225 A1* | 12/2018 | Bishnoi | ........ | G06F 1/305 |
| 2019/0018745 A1* | 1/2019 | Ito | ........ | G06F 3/065 |
| 2019/0303245 A1* | 10/2019 | Romanenko | ........ | G06F 11/2094 |

(Continued)

OTHER PUBLICATIONS

International Search Report and Written Opinion—PCT/US2024/047036—ISA/EPO—Jan. 8, 2025.

*Primary Examiner* — Stephanie Wu
(74) *Attorney, Agent, or Firm* — Norton Rose Fulbright US LLP

(57) ABSTRACT

This disclosure provides systems, methods, and devices for memory systems that support automatic backup of data upon detection of a potential damage condition. In a first aspect, a method includes detecting, by at least one processor of an apparatus, a potential damage condition for the apparatus and, in response to detection of the potential damage condition for the apparatus, performing, by the at least one processor of the apparatus, a data backup of data stored in at least one memory of the apparatus. Other aspects and features are also claimed and described.

30 Claims, 8 Drawing Sheets

(56) References Cited

U.S. PATENT DOCUMENTS

| | | | | |
|---|---|---|---|---|
| 2020/0065278 A1* | 2/2020 | Lukas | .................. | G06F 1/30 |
| 2021/0248842 A1* | 8/2021 | Dittrich | .............. | G06F 11/3476 |
| 2022/0326862 A1* | 10/2022 | Chen | .................. | G06F 3/0659 |

* cited by examiner

| S. No. | Policy Condition | Category | Description |
|---|---|---|---|
| 1 | Data-over write | PermissionPolicy | Overwrite data at previous location |
| 2 | Fire/Water Detection | SystemPolicy | Critical Data backup initiate to Cloud |
| 3 | Fall Detection | SystemPolicy | Critical Data backup initiate to Flash Storage |
| 4 | False Detection | SystemPolicy | Notify user after a Time period, e.g., 1-2 min |
| 5 | Authorization | PermissionPolicy | Whom to access data |
| 6 | Backup processing SW Image Loading | Image Policy | Load a Tiny Image/Island image etc. on to one of the processing subsystems – e.g., Modem SS/ ADSP SS/Sensor SS etc. – as per design choice |

FIG. 6

AUTOMATED DAMAGE CONDITION DETECTION AND DATA BACKUP IN AN ELECTRONIC DEVICE

TECHNICAL FIELD

Aspects of the present disclosure relate generally to an apparatus and method for controlling data backup in an electronic device. Some aspects may, more particularly, relate to an apparatus and method for controlling operations for automatically backing up critical data upon detection of a damage event.

Introduction

As the value and use of information continues to increase, individuals and businesses seek additional ways to process and store information. In addition, the use of information in various locations and desired portability of information is increasing. For this reason, users are increasingly turning towards the use of portable electronic devices, such as mobile phones, digital cameras, laptop computers and the like. Portable electronic devices generally employ a memory system using a memory device for storing data. A memory system may be used as a main memory or an auxiliary memory of a portable electronic device.

The memory device of the memory system may include one kind or a combination of kinds of storage. For example, magnetic-based memory systems, such as hard disk drives (HDDs), store data by encoding data as a combination of small magnets. As another example, optical-based memory systems, such as digital versatile discs (DVDs) and Blu-ray media, store data by encoding data as physical bits that cause different reflections when illuminated by a light source. As a further example, electronic memory devices store data as collections of electrons that can be detected through voltage and/or current measurements.

Electronic memory devices can be advantageous in certain systems in that they may access data quickly and consume a small amount of power. Examples of an electronic memory device having these advantages include universal serial bus (USB) memory devices (sometimes referred to as "memory sticks"), a memory card (such as used in some cameras and gaming systems), and solid state drive (SSDs) (such as used in laptop computers). NAND flash memory is one kind of memory device that may be used in electronic memory devices. NAND flash memory is manufactured into memory cards or flash disks. Example memory cards include compact flash (CF) cards, multimedia cards (eMMCs), smart media (SM) cards, and secure digital (SD) cards.

A memory system may, in some cases, be integrated with or otherwise connected to a host device, such as an electronic device. For example, memory systems may be integrated with host devices in a system on chip (SoC). As one particular example, a flash memory system, which may be a universal flash storage (UFS) memory system, may be integrated into an electronic device, such as an access point (AP), station (STA), user equipment (UE), base station, modem, camera, automobile, or other system.

One standard for organization and operation of electronic memory devices is the Universal Flash Storage (UFS) standard. The UFS standard was introduced as a successor to the eMMC (embedded MultiMediaCard) standard to offer higher performance and lower power consumption for mobile and other embedded devices. UFS provides support for a range of features such as multi-lane configurations, command queuing, and power-saving modes that enable high-speed data transfer rates, low latency, and long battery life. The UFS standard specifies many parameters for structuring, reading data from, and writing data to UFS-compliant memory devices. For example, UFS-compliant devices may include digital cameras, mobile phones, consumer electronic devices, and other devices with internal memory capacity. UFS-compliant memory may include memory embedded within electronic devices and removable memory cards, and UFS memory devices may implement NAND flash memory.

Electronic devices may be connected to wireless networks, such as through cellular, Wi-Fi, or other wireless connections. Electronic devices may transmit data to and receive data from other electronic devices via such networks. In some cases, electronic devices may transmit data via such wireless networks for remote storage in remote electronic devices.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

During day to day use, electronic devices may be exposed to various scenarios, such as falls and impacts, overheating events, water contact events, friction events, and other events, that may result in damage to the electronic devices. Such events may result in loss of data stored in memories of such devices, such as volatile memories, caches, static random access memories (SRAMs), double data rate synchronous dynamic random access memories (DDR SDRAMs), and other memories. Electronic devices may, however, detect such events in advance through monitoring of sensor data from sensors of the electronic devices, such as accelerometers, gyroscopes, temperature sensors, moisture sensors, barometric pressure sensors, infrared flame sensors, and other sensors. When an electronic device senses a potential damage event, such as through detection of movement of a device that exceeds a threshold acceleration or velocity, temperature of a device that exceeds a threshold temperature, a moisture level of a device that exceeds a threshold moisture level, or other parameter of a device that exceeds a threshold level, the electronic device may automatically backup data stored in a memory of the device to allow access of the data following damage of the device. Data may be backed up to a different memory of the device, such as a storage flash memory of the device, which may be an eMMC or UFS memory of the device, to allow for access even if the device is damaged. For example, a flash memory of the device may maintain stored data even after the device loses power, allowing a user to access data backed up on the flash memory even if the device is damaged or loses power. Furthermore, data stored on a flash memory may be more easily accessible than data stored on other memories of the device if the device suffers critical damage. As another example, data may be wirelessly transmitted to a remote data storage, such as a remote server, via a wireless connection, such as a cellular, Wi-Fi, or other wireless connection.

Backup of data to a local or remote memory may allow a user to access data stored on the electronic device even if the electronic device suffers critical damage and is no longer functional. Automatic backup of data upon detection of a potential damage event may allow the device to rapidly trigger an automatic backup of data without user input, such as when the user is not currently using the device or when the user drops the device. Thus, data may be backed up even when a user is unaware of or unable to stop a potential damage condition.

In one aspect of the disclosure, an electronic device includes at least one memory and at least one processor coupled to the memory. The at least one processor may be configured to perform operations including "detecting a potential damage condition for the apparatus and, in response to detection of the potential damage condition for the apparatus, performing a data backup of data stored in the at least one memory of the apparatus. In another aspect of the disclosure, a method for performing these operations, such as by a processor by executing instructions stored in a memory coupled to the processor, is also disclosed. In an additional aspect of the disclosure, a non-transitory computer-readable medium stores instructions that, when executed by a processor, cause the processor to perform these operations. In another aspect of the disclosure, an apparatus may include means for performing these operations.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases s may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6 is a chart illustrating example data backup policies according to some embodiments of the disclosure.

Like reference numbers and designations in the various drawings indicate like elements.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support automated data backup of data stored in an electronic device. Aspects of this disclosure provide for operations and data structures used in those operations for automated damage condition detection and data backup of data stored in an electronic device to a local memory or to a remote data storage.

Particular implementations of the subject matter described in this disclosure may be implemented to realize one or more of the following potential advantages or benefits. In some aspects, the present disclosure provides techniques for improved performance of a memory system, such as preservation of data when a device is damaged by a fall, contact with water, overheating, or another damage condition. Furthermore, some implementations of the subject matter described in this disclosure may allow for prioritized data backup upon detection of a potential damage condition, allowing a user to select prioritization parameters for backup of data in time-critical damage scenarios.

Figure 1:
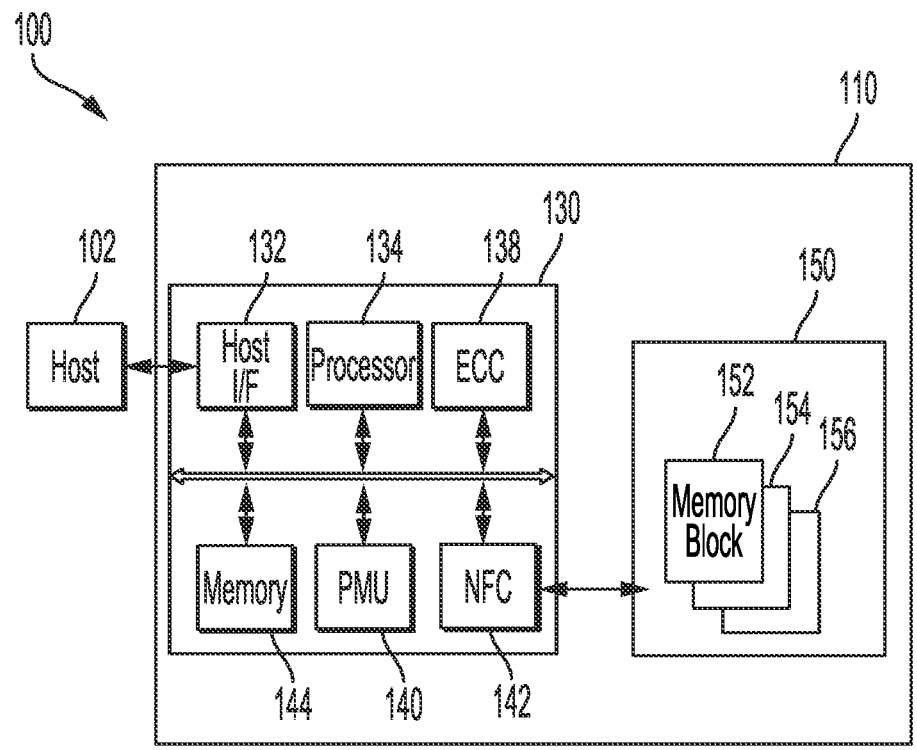
FIG. 1 is a block diagram illustrating a data processing system including a memory system in accordance with an embodiment of the present invention.

Memory may be used in a computing system organized as illustrated in FIG. 1. FIG. 1 illustrates a data processing system 100, such as may be included in an electronic device, such as a mobile computing device, according to one or more aspects of the disclosure. A memory system 110 may couple to a host device 102 through one or more channels. For example, the host device 102 and memory system 110 may be coupled through a serial interface including a single channel for the transport of data or a parallel interface including two or more channels for the transport of data. In some aspects, control data may be transferred through the same channel(s) as the data or the control data may be transferred through additional channels. The host device 102 may be, for example, a portable electronic device such as a mobile phone, an MP3 player, a laptop computer, or a non-portable electronic device such as a desktop computer, a game player, a television (TV), a media player, or a projector. As another example, the host device 102 may be an automotive computer system. In some examples, the memory system 110 may be included in the host device 102. Thus, the data processing system 100 may be any of the example host devices described herein including the memory system 110. Additional example host devices are illustrated and described with reference to FIG. 11.

The memory system 110 may execute operations in response to commands (e.g., a request) from the host device 102. For example, the memory system 110 may store data provided by the host device 102 and the memory system 110 may also provide stored data to the host device 102. The memory system 110 may be used as a main memory, short-term memory, or long-term memory by the host device 102. As one example of main memory, the host device 102 may use the memory system 110 to supplement or replace a system memory by using the memory system 110 to store temporary data such as data relating to operating systems and/or threads executing in the operation system. As one example of short-term memory, the host device 102 may use the memory system 110 to store a page file for an operating system. As one example of long-term memory, the host device 102 may use the memory system 110 to store user files (e.g., documents, videos, pictures) and/or application files (e.g., word processing executable, gaming application).

The memory system 110 may be implemented with any one of various storage devices, according to the protocol of a host interface for the one or more channels coupling the memory system 110 to the host device 102. The memory system 110 may be implemented with any one of various storage devices, such as a solid state drive (SSD), a multi-media card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, or a memory stick.

The memory system 110 may include a memory module 150 and a controller 130 coupled to the memory module 150 through one or more channels. The memory module 150 may store and retrieve data in memory blocks 152, 154, and 156 under control of the controller 130, which may execute commands received from the host device 102. The controller 130 is configured to control data exchange between the memory module 150 and the host device 102. The storage components, such as blocks 152, 154, and 156 in the memory module 150 may be implemented as volatile memory device, such as, a dynamic random access memory (DRAM) and a static random access memory (SRAM), or a non-volatile memory device, such as a read only memory (ROM), a programmable ROM (PROM), an erasable programmable ROM (EPROM), an electrically erasable programmable ROM (EEPROM), a ferroelectric random access memory (FRAM), a phase-change RAM (PRAM), a magnetoresistive RAM (MRAM), a resistive RAM (SCRAM), or a NAND flash memory.

The controller 130 and the memory module 150 may be formed as integrated circuits on one or more semiconductor dies (or other substrate). In some aspects, the controller 130 and the memory module 150 may be integrated into one chip. In some aspects, the memory module 150 may include one or more chips coupled in series or parallel with each other and coupled to the controller 130, which is on a separate chip. In some aspects, the memory module 150 and controller 130 chips are integrated in a single package, such as in a package on package (POP) system. In some aspects, the memory system 110 is integrated on a single chip with one or more or all of the components (e.g., application processor, system memory, digital signal processor, modem, graphics processor unit, memory interface, input/output interface, network adaptor) of the host device 102, such as in a system on chip (SoC). The controller 130 and the memory module 150 may be integrated into one semiconductor device to form a memory card, such as, for example, a Personal Computer Memory Card International Association (PCMCIA) card, a compact flash (CF) card, a smart media card (SMC), a memory stick, a multimedia card (MMC), an RS-MMC, a micro-MMC, a secure digital (SD) card, a mini-SD, a micro-SD, an SDHC, and a universal flash storage (UFS) device.

The controller 130 of the memory system 110 may control the memory module 150 in response to commands from the host device 102. The controller 130 may execute read commands to provide the data from the memory module 150 to the host device 102. The controller 130 may execute write commands to store data provided from the host device 102 into the memory module 150. The controller 130 may execute other commands to manage data in the memory module 150, such as program and erase commands. The controller 130 may also execute other commands to manage control of the memory system 110, such as setting configuration registers of the memory system 110. By executing commands in accordance with the configuration specified in the configuration registers, the controller 130 may control operations of the memory module 150, such as read, write, program, and erase operations.

The controller 130 may include several components configured for performing the received commands. For example, the controller 130 may include a host interface (I/F) unit 132, a processor 134, an error correction code (ECC) unit 138, a power management unit (PMU) 140, a NAND flash controller (NFC) 142, and/or a memory 144. The power management unit (PMU) 140 may provide and manage power for components within the controller 130 and/or the memory module 150.

The host interface unit 132 may process commands and data provided from the host device 102, and may communicate with the host device 102, through at least one of various interface protocols such as universal serial bus (USB), multimedia card (MMC), peripheral component interconnect express (PCI-e), serial attached SCSI (SAS), serial advanced technology attachment (SATA), parallel advanced technology attachment (PATA), small computer system interface (SCSI), enhanced small disk interface (ESDI), and integrated drive electronics (IDE). For example, the host interface 132 may be a parallel interface such as an MMC interface, or a serial interface such as an ultra-high speed class 1 (UHS-I)/UHS class 2 (UHS-II) or a universal flash storage (UFS) interface.

The ECC unit 138 may detect and correct errors in the data read from the memory module 150 during the read operation. The ECC unit 138 may not correct error bits when the number of the error bits is greater than a threshold number of correctable error bits, which may result in the ECC unit 138 outputting an error correction fail signal indicating failure in correcting the error bits. In some aspects, no ECC unit 138 may be provided or the ECC unit 138 may be configurable to be active for some or all of the memory module 150. The ECC unit 138 may perform an error correction operation using a coded modulation such as a low-density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), or a Block coded modulation (BCM).

The NFC 142 provides an interface between the controller 130 and the memory module 150 to allow the controller 130 to control the memory module 150 in response to a commands received from the host device 102. The NFC 142 may generate control signals for the memory module 150, such as signals for rowlines and bitlines, and process data under the control of the processor 134. Although NFC 142 is described as a NAND flash controller, other controllers may perform similar function for other memory types used as memory module 150.

The memory 144 may serve as a working memory of the memory system 110 and the controller 130. The memory 144 may store data for driving the memory system 110 and the controller 130. When the controller 130 controls an operation of the memory module 150 such as, for example, a read, write, program or erase operation, the memory 144 may store data which are used by the controller 130 and the memory module 150 for the operation. The memory 144 may be implemented with a volatile memory such as, for example, a static random access memory (SRAM) or a dynamic random access memory (DRAM). In some aspects, the memory 144 may store address mappings, a program memory, a data memory, a write buffer, a read buffer, a map buffer, and the like.

The processor 134 may control the general operations of the memory system 110, and a write operation or a read operation for the memory module 150, in response to a write request or a read request received from the host device 102, respectively. For example, the processor 134 may execute firmware, which may be referred to as a flash translation layer (FTL), to control the general operations of the memory system 110. The processor 134 may be implemented, for example, with a microprocessor or a central processing unit (CPU), or an application-specific integrated circuit (ASIC).

In some aspects, the memory module 150 may be a memory to which data is backed up from another memory of the host device 102 when a potential damage condition to the data processing system 100 is detected, as discussed herein. For example, the memory module 150 may be a non-volatile memory, such as a flash storage memory of the data processing system 100, to which data may be backed up from a volatile memory, such as an SRAM, DDR SDRAM, or other volatile memory, of the host device 102.

Figure 2:
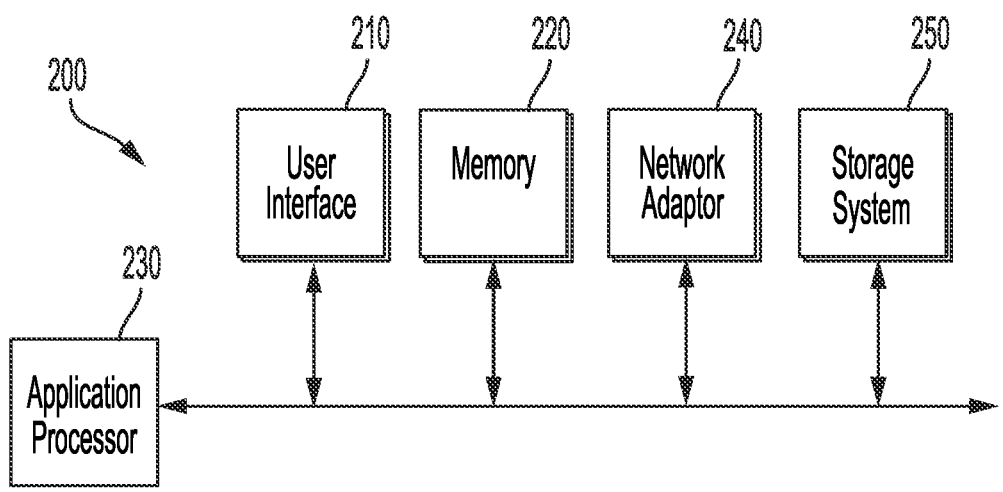
FIG. 2 is a block diagram illustrating an example electronic device including the memory system according to one or more aspects of the disclosure.

FIG. 2 is a block diagram illustrating an example electronic device including the memory system 100 according to one or more aspects of the disclosure. The electronic device 200 may include a user interface 210, a memory 220, an application processor 230, a network adaptor 240, and a storage system 250 (which may be one embodiment of the memory system 100 of FIG. 1). The application processor 230 may be coupled to the other components through a bus, such as a peripheral component interface (PCI) bus, including a PCI express (PCIe) bus.

The application processor 230 may execute computer program code, including applications, drivers, and operating systems, to coordinate performing of tasks by components included in the electronic device 200. For example, the application processor 230 may execute a storage driver for accessing the storage system 250. The application processor 230 may be part of a system-on-chip (SoC) that includes one or more other components shown in electronic device 200.

The memory 220 may operate as a main memory, a working memory, a buffer memory or a cache memory of the electronic device 200. The memory 220 may include a volatile random access memory such as a dynamic random access memory (DRAM), a synchronous dynamic random access memory (SDRAM), a double data rate (DDR) SDRAM, a DDR2 SDRAM, a DDR3 SDRAM, a low power double data rate (LPDDR) SDRAM, an LPDDR2 SDRAM, an LPDDR3 SDRAM, an LPDDR4 SDRAM, an LPDDR5 SDRAM, or an LPDDR6 SDRAM, or a nonvolatile random access memory such as a phase change random access memory (PRAM), a resistive random access memory (ReRAM), a magnetic random access memory (MRAM) and a ferroelectric random access memory (FRAM). In some aspects, the application processor 230 and the memory 220 may be combined using a package-on-package (POP).

The network adaptor 240 may communicate with external devices. For example, the network adaptor 240 may support wired communications and/or various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (WiMAX), wireless local area network (WLAN), ultra-wideband (UWB), Bluetooth, wireless display (Wi-Di), and so on, and may thereby communicate with wired and/or wireless electronic appliances, for example, a mobile electronic appliance.

The storage system 250 may store data, for example, data received from the application processor 230, and transmit data stored therein, to the application processor 230. The storage system 250 may be a non-volatile semiconductor memory device, such as a phase-change RAM (PRAM), a magnetic RAM (MRAM), a resistive RAM (ReRAM), a NAND flash memory, a NOR flash memory, or a 3-dimensional (3-D) NAND flash memory. The storage system 250 may be a removable storage medium, such as a memory card or an external drive. For example, the storage system 250 may correspond to the memory system 110 described above with reference to FIG. 1 and may be a SSD, eMMC, UFS, or other flash memory system.

The user interface 210 provide one or more graphical user interfaces (GUIs) for inputting data or commands to the application processor 230 or for outputting data to an external device. For example, the user interface 210 may include user input interfaces, such as a virtual keyboard, a touch screen, a camera, a microphone, a gyroscope sensor, or a vibration sensor, and user output interfaces, such as a liquid crystal display (LCD), an organic light emitting diode (OLED) display device, an active matrix OLED (AMO-LED) display device, a light emitting diode (LED), a speaker, or a haptic motor.

The operations and capabilities described above may be used for a memory system that supports automated damage condition detection and data backup in an electronic device. Such backup may be performed upon detection of a potential damage condition, such as a water damage condition, a fire damage condition, an impact damage condition, or other damage condition. The data may be backed up to local data storage, such as a flash memory of the electronic device, or to a remote data storage, such as a remote server. Furthermore, a user may customize prioritization of data to be backed up when a potential damage condition is detected such that data is of a greater importance to a user may be backed up before data that is of a lesser importance to a user. Such data backup may allow for copying of critical data stored in a memory, such as a volatile memory, of the electronic device prior to damage to the electronic device to allow a user to recover the data even if the electronic device is unable to be repaired.

Figure 3:
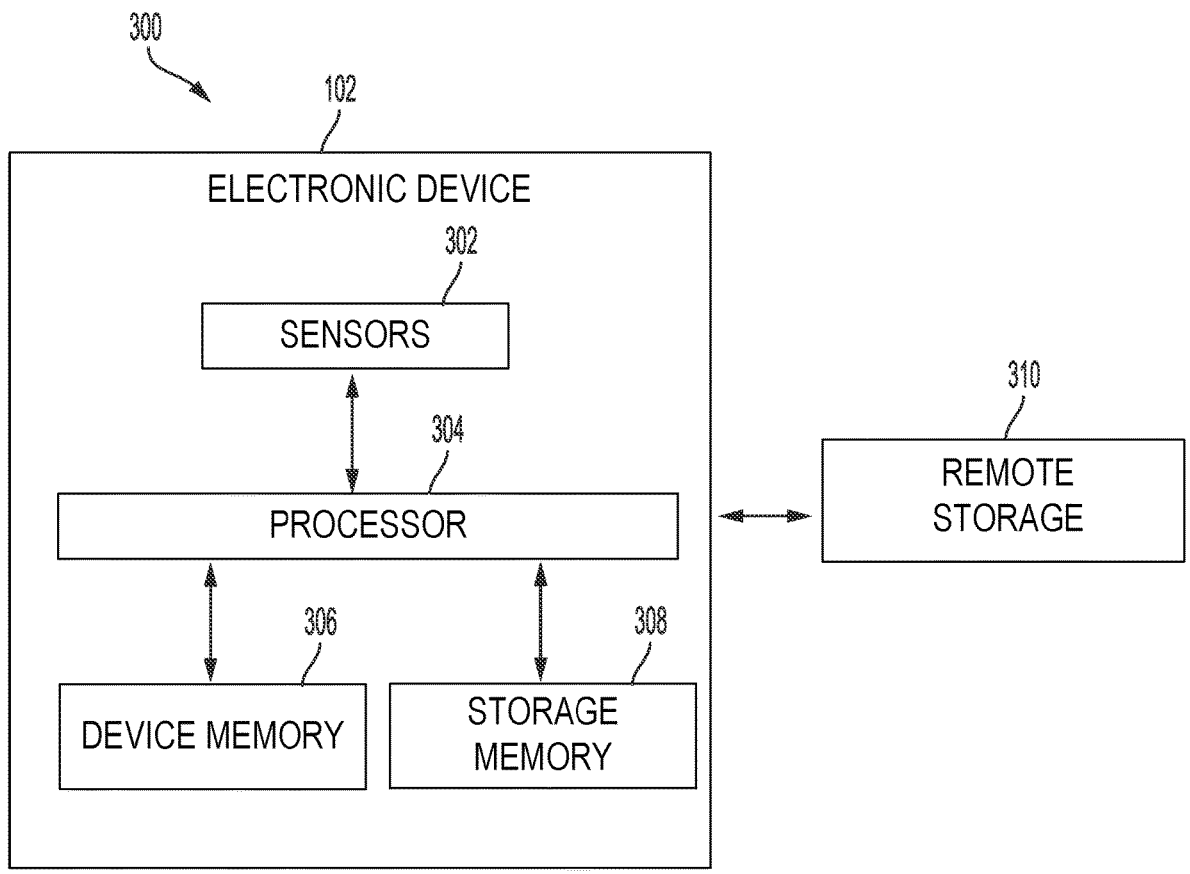
FIG. 3 is a block diagram illustrating an example electronic device configured for automatic backup of data upon detection of a potential damage condition according to some embodiments of the disclosure.

A block diagram 300 illustrating an example electronic device 102 configured for automatic backup of data upon detection of a potential damage condition is shown in FIG. 3. The electronic device 102 may, for example, be a smartphone, a laptop, a wearable, a camera, or another electronic device. Such devices may be subjected to damage conditions, such as impact damage when a device is dropped or otherwise impacted, friction damage from application of force while the device is dragged across a rough surface, temperature damage, when the device overheats or is exposed to flame, liquid damage, such as when the device is dropped into a liquid, such as water, or when the liquid is poured onto the device, and other damage conditions. Such damage conditions may, in some cases, result in critical damage to an electronic device, sometimes rendering the device inoperable. If the device loses power and/or is rendered inoperable, data stored in a memory of the device, such as a volatile memory of the device, may be lost. In some cases, damage that is severe enough may result in loss of data stored in non-volatile memories of the electronic device, such as in flash memories of the device.

Automatic backup of data when a potential damage condition for a device is detected may allow for recovery of some, or all, data that would otherwise be lost due to damage of a device. Such automatic backup may be particularly important in the context of mobile devices and smart watches, where a user may damage the device while wearing or holding the device, and in the context of rugged devices where devices may be more likely to be subjected to greater temperatures, impacts, and other potential damage conditions. Automatic backup of data may be customizable by a user, manufacturer, or administrator to prioritize backing up data of greater importance, such as backing up location data, sensor data, data stored in registers, SRAM, tightly coupled memory (TCM), DDR RAM, most recent images captured by an image sensor, data regarding open or active applications, and other data. An amount of data to be backed up may range anywhere from a few kilobytes of data to gigabytes of data, or more.

The electronic device 102 may include one or more sensors 302 such as temperature sensors, gyroscopes, accelerometers, moisture sensors, barometric pressure sensors, infrared flame sensors, and other sensors to detect potential damage conditions to the electronic device. For example, the sensors 302 may provide sensor data to the processor 304, and the processor 304 may monitor the sensor data to detect potential damage conditions. As one example, the electronic device 102 may fall for approximately 550 ms when dropped from a height of 1.5 meters. Thus, if a potential damage condition is detected by the processor 304 based on sensed data from the sensors 302, such as a sensed rapid increase in acceleration or velocity in a downward direction, the processor 304 may initiate a backup operation to copy data stored in the device memory 306 of the electronic device 102. In some embodiments, the processor 304 may perform clock bumping, such as overclocking for a controller of the storage memory 308, the processor 304, and/or a memory of the storage memory 308 to increase a read/write speed when performing the backup operation. Overclocking of the processor 304 may, for example, include overclocking of a low power secondary processor of the electronic device 102 or of a main application processor of the electronic device 102. Furthermore, the processor 304 may perform gear or lane switching to increase a read or write speed to the storage memory 308. For example, if the device memory 306 and/or the storage memory 308 includes a memory configured according to the embedded multimedia card (eMMC) JEDEC standard, the processor 304 may initiate a gear switch to a high speed 200 (HS200) or a high speed 400 (HS400) configuration to increase a read speed from the device memory 306 and/or a write speed to the storage memory 308. As another example, if the device memory 306 or the storage memory 308 includes a memory configured according to the nonvolatile memory express (NVMe) specification, the processor 304 may switch to a highest PCIe speed. The device memory 306 may, for example, include volatile memory, cache memory, register memory, SRAM, TCM, DDR RAM, or other memory of the electronic device. The data stored in the device memory 306 may be copied to a storage memory 308 of the device 102, such as a nonvolatile memory or a flash memory of the device 102, or to a remote storage 310. For example, when the device 102 detects a potential damage condition, such as a potential drop condition based on a sensed change in velocity or acceleration, the device 102 may begin backing up data stored in the device memory 306. As discussed herein, such backup may be prioritized such that data designated at higher priority levels is backed up before data designated at lower priority levels. Thus, in the case of a drop from 1.5 meters, the electronic device 102 may have approximately 550 ms, including time required to initialize the backup operation, to backup data from the device memory 306 to the storage memory 308 or to a remote storage 310. 550 ms may provide sufficient time to back up anywhere from one or more kilobytes of data to more than two megabytes of data.

As another example, the electronic device 102 may be dropped into the water or water may be spilled on the electronic device 102. Upon such an event, a potential water damage condition may be detected based on data from a moisture sensor, a barometric pressure sensor, a conductivity sensor, such as a USB-C conductivity sensor, or other sensors of sensors 302 and an automatic backup operation may be initiated based on the detection of the potential damage condition. In the case of a potential water damage condition, the electronic device 102 may have a time frame from approximately 2-3 seconds to greater than 20 minutes, to backup data before water damage renders the device inoperable/unable to backup data.

As another example, the electronic device 102 may be exposed to excessive heat. Upon such exposure, a potential temperature or fire damage condition may be detected based on data from a temperature sensor indicating the device has exceeded a temperature threshold. For example, some electronic devices may be configured to automatically shut down when a temperature of a battery of the device exceeds sixty degrees Celsius to prevent the battery from overheating and combusting. Thus, when a potential temperature or fire damage condition is detected, such as by detection of a temperature exceeding a threshold level for a predetermined time based on sensed temperature data from a temperature sensor of sensors 302, the electronic device 102 may initiate a backup from device memory 306 to storage memory 308 and/or remote storage 310. As one particular example, when a processor 304 of an electronic device 102, such as a smart phone, receives temperature data from sensors 302 indicating that a temperature of the device has exceeded fifty degrees Celsius, for one sensed data point or for a predetermined period of time. In some aspects, temperature sensors of sensors 302 may have clock frequencies in the MHz range, allowing for polling of sensed temperature data by processor 204 and detection of increases in temperature beyond a threshold level within a few microseconds of the temperature of the device exceeding the threshold level. As another example, when a processor 304 of the electronic device 102, such as an industrial device, receives data from an infrared flame sensor of sensors 302 indicating detection of fire on a body of the device, the processor 304 may begin backing up data.

A time available for backup of data from a device memory 306 to a storage memory 308 or a remote storage 310 may depend on a type of potential damage event that has occurred and parameters of the electronic device 102 and/or remote storage 310. For example, a time for the device 102 to detect a potential damage condition based on data from sensors 302 may be approximately 1-2 milliseconds. A time to wake one or more subsystems of the electronic device 102 for initializing hardware and software for performing the backup operation, which may be initialization time associated with copying an island image, tiny image, page only image, or sensor only image to a cache, such as an L2 cache of the electronic device 102, may be approximately 300 microseconds. A time for the device 102 to initialize the backup function, such as a time to implement backup operation policies and to prepare for data transfers may be approximately 50 to 60 milliseconds. In some examples, operations to initialize a backup operation upon detection of a potential damage condition may leave 487 milliseconds for a backup operation in the case of a detected fall or drop of 1.5 meters, 20-30 seconds for a backup operation in the case of an overheating scenario, or 5-20 minutes for a backup operation in the case of a water damage scenario. Such time periods may allow for backing up of up to and exceeding 442 megabytes of data to an internal memory, such as a flash memory, of the electronic device 102 and up to and exceeding 1217 megabytes to a remote data storage depending on device data transmission and memory read/write speeds.

In scenarios where a substantial amount of time is available for backup of data from the device memory 306 of the electronic device 102 to the storage memory 308 or the remote storage 310, such as potential water damage conditions or potential temperature damage conditions, a substantial amount of data may be backed up. For example, if a wireless connection, such as a Wi-Fi, 5G or 6G cellular, or other wireless connection, is available, the electronic device 102 may back up a substantial amount of data to the remote storage 310. Furthermore, in the case of water damage or fire damage, potential recovery of backed up data from the storage memory 308 of the electronic device 102 may be less likely, as the device may not be recoverable and/or the storage memory 308 may be damaged as well. As one particular example, if twenty-five seconds are available to backup data to a remote storage 310 following detection of a potential temperature damage condition for the device 102 and initialization of a backup operation, the device 102 may transmit 62.5 GB of data for storage at the remote storage 310 with a 5G cellular data transmission rate of 20 Gbps or 3.1 TB of data for storage at the remote storage 310 with a 6G cellular data transmission rate of 1000 Gbps in the twenty-five seconds available for data transmission. As another example, if twenty minutes are available to backup data to a remote storage 310 following detection of a potential water damage condition for the device 102 and initialization of a backup operation, the device 102 may transmit 3000 GB of data for storage at the remote storage 310 with a 5G cellular data transmission rate of 20 Gbps or 150 TB of data for storage at the remote storage 310 with a 6G cellular data transmission rate of 1000 Gbps in the twenty minutes available for data transmission. Thus, in some scenarios a full backup of a memory of the electronic device to a remote storage 310 may be performed following detection of a potential damage condition.

Figure 4:
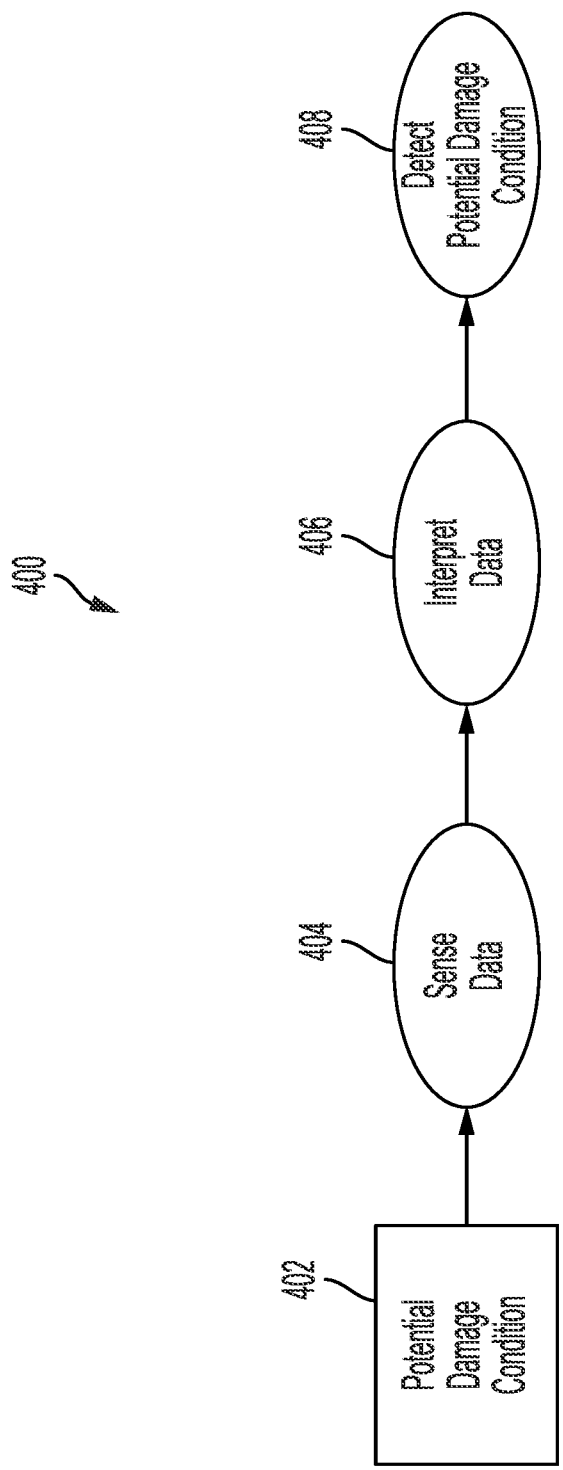
FIG. 4 is a flow diagram illustrating potential damage condition detection in an electronic device according to some embodiments of the disclosure.

An electronic device, such as electronic device 102 may include multiple sensors 302 providing sensor data to the processor 304, which may allow the processor 304 to detect a variety of different potential damage conditions as discussed herein. FIG. 4 is a flow diagram 400 illustrating potential damage condition detection in an electronic device according to some embodiments of the disclosure. At block 402 a potential damage condition to an electronic device may occur. For example, the device 102 of FIG. 3 may be dropped or otherwise placed in a free-fall condition, may be exposed to water, may be exposed to a temperature above a predetermined threshold, or may otherwise be placed in a potential damage condition. At block 404, one or more sensors of the electronic device, such as sensors 302 of FIG. 3, may generate sensor data indicating the presence of the potential damage condition. For example, a thermal sensor may generate sensor data indicating a temperature of the electronic device that exceeds a threshold level. As another example, one or more accelerometers or gyroscopes may generate sensor data indicating that the device is in free fall. As another example, one or more moisture or barometric pressure sensors of the electronic device may indicate that the device has been exposed to a liquid, such as water. In some aspects, a frequency of output of sensor data from sensors of the electronic device may be increased such that the sensors poll data more frequently to allow the processor to detect potential damage conditions more quickly. The sensor data may be received by a processor of the electronic device, such as processor 304 of FIG. 3, and at block 406, the processor of the electronic device may interpret the data. For example, the processor 304 may determine that a temperature indicated by data received from one or more sensors exceeds a threshold temperature level or has exceeded a threshold temperature level for a predetermined period of time. As another example, the processor may determine that an acceleration or velocity of the device towards a surface indicated by the received sensor data exceeds or falls beneath a threshold acceleration or velocity. In particular, an acceleration indicated by sensor data from an accelerometer may read near 0 when the electronic device is in a free fall state. An output frequency of an accelerometer may, for example, be 10 kHz, outputting a sensed value every 0.1 ms. A processor may, for example, interpret data to detect a free fall condition based on approximately 10-20 outputs from the accelerometer to allow detection of a free fall in 1-2 ms. As another example, the processor may determine that a moisture level or barometric pressure of the device indicated by the sensor data exceeds a threshold moisture level or barometric pressure. At block 408, the processor may detect, based on the interpretation of the received sensor data at block 406, that a potential damage condition has occurred. The electronic device may then initiate a backup procedure as described herein to backup data stored in a memory of the electronic device. In some aspects, the electronic device may detect that detection of a potential damage condition at block 408 was a false positive, such as a through detection of a reduction in temperature below a threshold level, acceleration or moisture data indicating that the device was not in free fall or not exposed to excessive moisture, or input from a user indicating that the device is not in a potential damage condition. Upon a determination that a detected potential damage condition was a false positive, the device may cease performing a backup operation and, in some cases, may delete the backed up data.

Figure 5:
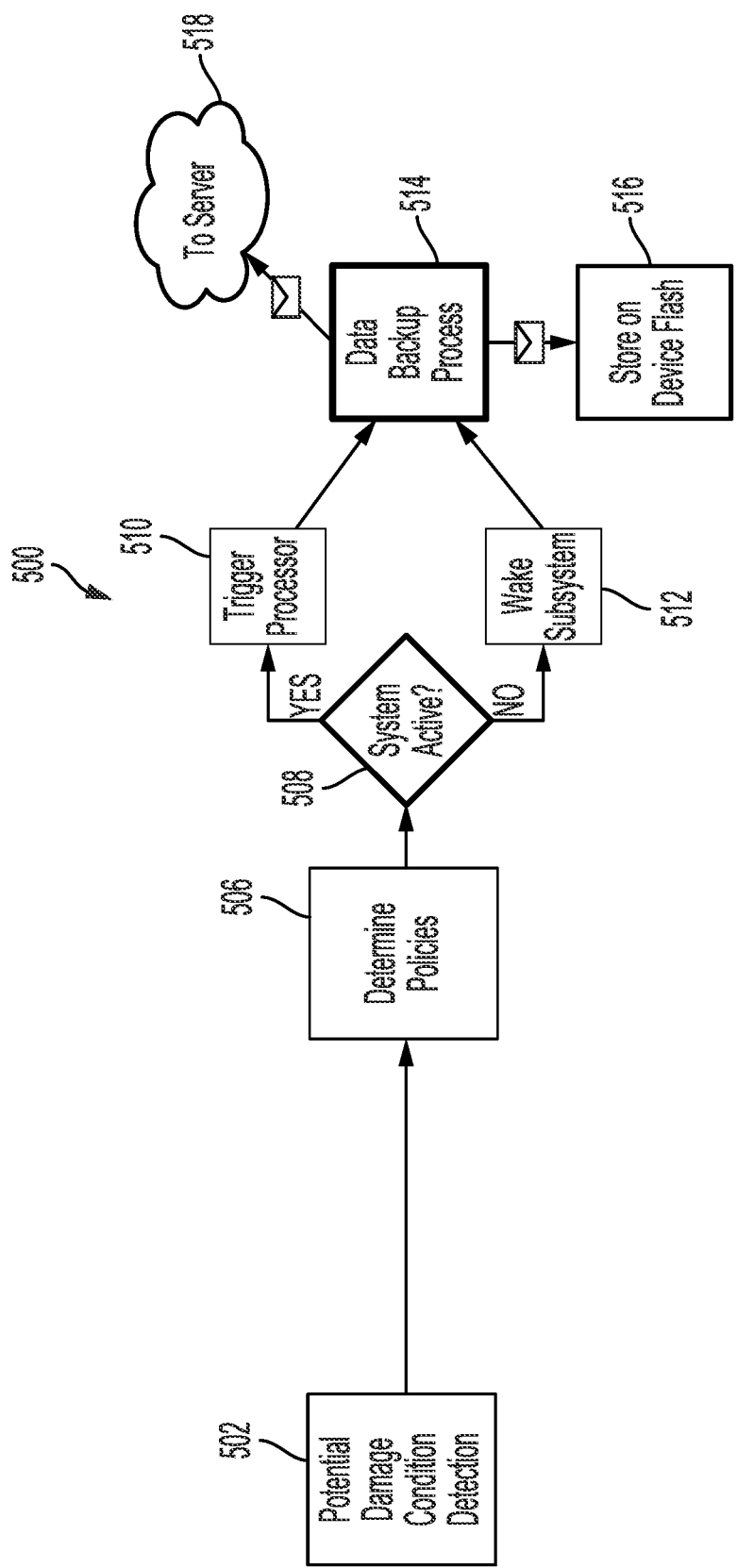
FIG. 5 is a flow diagram illustrating potential damage condition detection and automatic data backup in an electronic device according to some embodiments of the disclosure.

FIG. 5 is a flow diagram 500 illustrating potential damage condition detection and automatic data backup in an electronic device according to some embodiments of the disclosure. The operations of the flow diagram 500 may, in some aspects, be performed by an electronic device, such as electronic device 102 of FIG. 3. At block 502, the electronic device may detect a potential damage condition. Such detection of a potential damage condition may include operations similar to those described with respect to the flow diagram 400 of FIG. 4. For example, a processor, such as a low power application digital signal processor (DSP) or microprocessor, of the electronic device, may operate to poll sensor data from one or more sensors while the device is in a sleep state. In some embodiments, a low power processor may initiate a data backup process, as described with respect to block 512. As another example, the device may not be in a low power or sleep state, and a low power processor may communicate with an application processor, such as a main processor, of the electronic device regarding detection of the potential damage condition through an inter-processor communication mechanism. The application processor may then initiate the data backup process based on the detection of the potential damage condition, as described with respect to block 510. In some aspects, the application processor may generate a high priority thread for performing the data backup operation.

At block 506, the electronic device may determine policies governing a backup operation following detection of a potential damage condition. Such policies may include image status policies, authorization policies, data overwrite policies, policies governing whether the data should be backed up to a local storage memory of the electronic device, such as a flash storage memory or a remote storage, such as a remote server, caution message policies, data backup prioritization policies, and other policies. Such policies may, in some aspects, be configurable by a manufacturer, administrator, organization, or user of the electronic device. In some aspects, certain policies may be configured for certain types of damage conditions. For example, if a potential thermal or water exposure damage condition is detected, a policy for backing up all data, or as much data as possible, to a remote server may be determined. As another example, if a potential drop or impact damage condition is detected, a policy for backing up prioritized data to a local memory, such as a local flash memory, may be determined.

At block 508, a determination may be made of whether one or more systems, such as a processor, for backing up the electronic device are currently active. If the one or more systems are currently active, the electronic device may, at block 510, trigger the processor to perform the backup operation. In some aspects, triggering the processor to perform the backup operation may include triggering an application processor module of the electronic device to perform the backup operation. In some aspects, triggering the backup operation may include initialization, by a processor, of a backup operation. If one or more systems or subsystems required for performing the backup are currently inactive, the electronic device may, at block 512, wake one or more systems or subsystems for performing the backup operation. Such waking may, for example, include waking one or more islands of the electronic device and/or suspending sleep states for one or more components of the electronic device. In some aspects, a wakeup may be performed on an application processor of the electronic device. A time required to wake the one or more systems or subsystems and/or enter an island mode may be approximately 300 microseconds. Such waking may include copying binary island data from a DDR RAM of the electronic device to an L2 cache of the electronic device for performing the backup operation.

At block 514, a data backup operation may be performed. Such a backup may be performed based on prioritization of data according to user-configured, organization-configured, manufacturer-configured, administrator-configured, or otherwise configured data backup prioritization. For example, types of data assigned higher priorities, such as sensor data, SRAM data, and DDR RAM data may be backed up prior to backing up of types of data assigned lower priorities, such as user defined data categories. Performing the data backup operation at block 514 may include determining whether to backup the data to a remote server or a local storage memory, such as a local flash memory, of the electronic device. Such a determination may, for example, be made based on presence of a network connection, or a strength of a network connection exceeding a predetermined threshold, based on policies determined at block 506, based on a type of potential damage condition detected at block 502, or based on other factors. If a determination is made to backup the data to a remote server, the electronic device may, at block 518, transmit data to the remote server for storage at the remote server. Such transmission may, for example, be performed across a wireless network, such as a Wi-Fi network, a cellular network, or another network. If a determination is made to back up the data to a local storage memory, such as a local flash memory, the electronic device may, at block 516, copy the data to the local storage memory. In some aspects backing up the data to the local storage memory at 516 may include copying data from one or more memories of the electronic device to a partition of the local storage memory allocated for storage of data when a potential damage condition is detected. In some aspects, backing up the data to the local storage memory at block 516 may include providing a priority and key index to an inline encryption engine (ICE) of the local storage memory. The ICE may, for example, encrypt data for secure transfer. In some aspects, the local storage memory may include an eMMC or UFS flash memory. In some aspects, the electronic device may backup the data both locally at block 516 and to a remote data storage at block 518.

FIG. 6 is a chart 600 illustrating example data backup policies according to some embodiments of the disclosure. Such policies may, for example, be policies of a policy engine for determining whether and how to perform a backup operation upon detection of a potential damage condition, such as described with respect to block 506 of FIG. 5. Example policies may be categorized in different categories, such as permission policies, system policies, image policies and other policies. One example policy may be a data over-write policy, which may indicate whether data previously stored at a location to which data is to be backed up, such as a local storage memory or a remote server, should be overwritten with new data to be backed up. Another example policy may be a fire or water detection policy, which may indicate that upon detection of a potential fire or water damage condition data should be backed up to the cloud, such as to a remote server. Another example policy may be a fall detection policy, which may indicate that upon detection of a potential fall or drop of the electronic device data should be backed up to a local storage memory, such as to a flash storage memory of the electronic device. Another example policy may be a false potential damage condition detection policy, which may include an indication that a user should be notified of a potential damage condition policy a predetermined time after a potential damage condition is detected, such as 1-2 minutes. The notification may allow a response from a user indicating that the potential damage condition was detected in error. Another example policy may be an authorization policy governing who may access data that is backed up. Another example policy may be a backup processing software image loading policy, which may indicate that the electronic device should copy a tiny image or island image to a processing subsystem, such as a modem subsystem, an audio digital signal processor (aDSP) subsystem, a sensor subsystem, or other subsystems, from a local memory, such as by copying binary island data from a DDR RAM memory to an L2 cache of the processing subsystem. In some aspects, policies may include an indication of one or more categories of data should be prioritized in a backup operation. For example, one or more policies may indicate priority levels of different types of data. In some aspects, such policies may be configured for a user. For example, a device may receive input from a user indicating priority levels of different types of data and may configure one or more policies according to the received input. In some aspects, policies may be updated at a boot time of the electronic device. Thus, various policies may be configured for automated damage condition detection and data backup in an electronic device.

Figure 7:
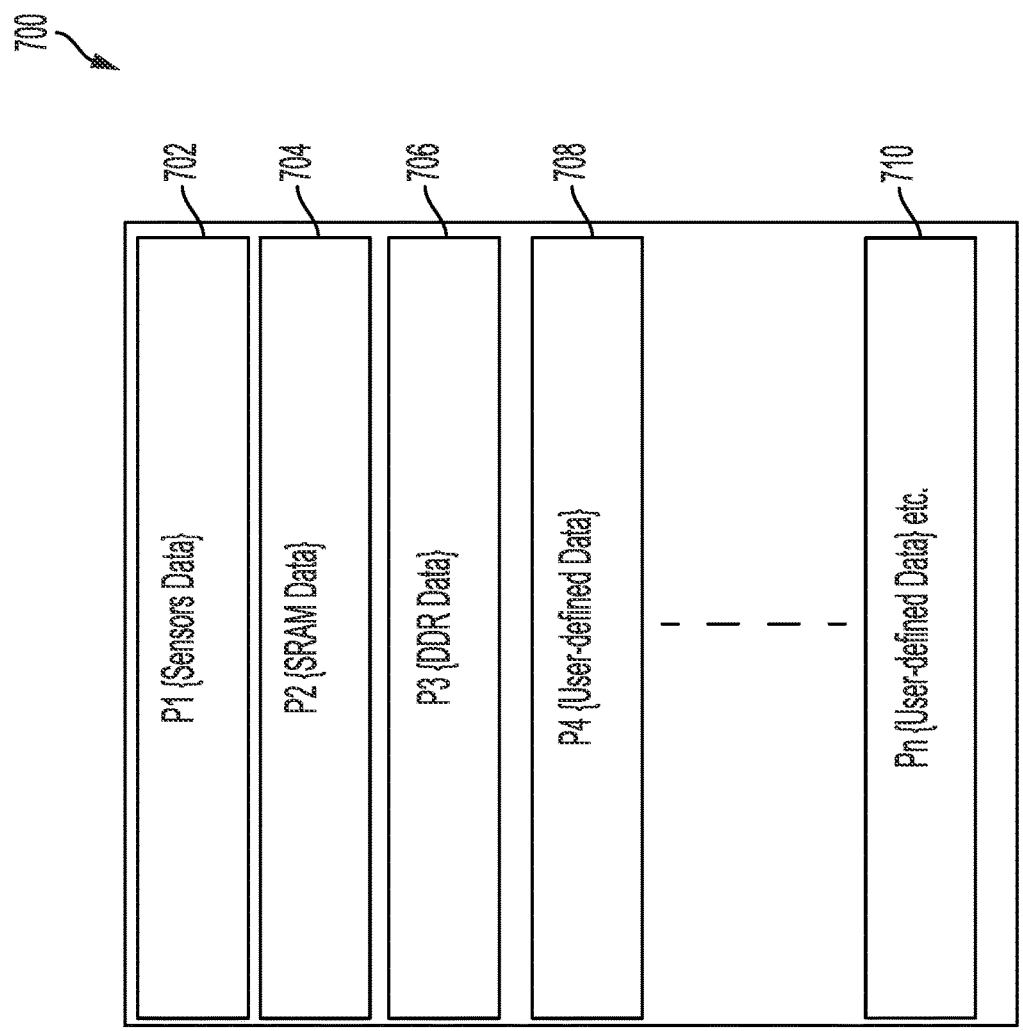
FIG. 7 is a block diagram of an example order of priority for data backup according to some embodiments of the disclosure.

Different priorities may be assigned to different categories of data to be backed up upon detection of a potential damage condition. Such priorities may be assigned by a user, by a manufacturer, by an organization, by an administrator, or otherwise assigned to categories of data. Data categories may be copied to a local storage memory or transmitted to a remote storage in an order determined based on assigned priorities. FIG. 7 is a block diagram 700 of an example order of priority for data backup according to some embodiments of the disclosure. As one example, a first category of data 702, sensor data, may be assigned a highest priority. Thus, sensor data may be backed up first when a backup operation is initialized. A second category of data 704, data stored in SRAM, may be assigned a second-highest priority. Thus, data stored in SRAM may be backed up second when a backup operation is initialized. A third category of data 706, data stored in DDR RAM, may be assigned a third-highest priority. Thus, data stored in DDR RAM may be backed up third when a backup operation is initialized. Other categories of data 708, 710, such as different categories of user data assigned priorities by a user, may be assigned different priorities and may also be uploaded in order of priority. Such other user data may include image data for one or more most recent images captured by the electronic device, message data, and other user data stored by the electronic device. Thus, different categories of data may be assigned different priorities, and backing up of data may be performed in order of assigned priorities.

Figure 8:
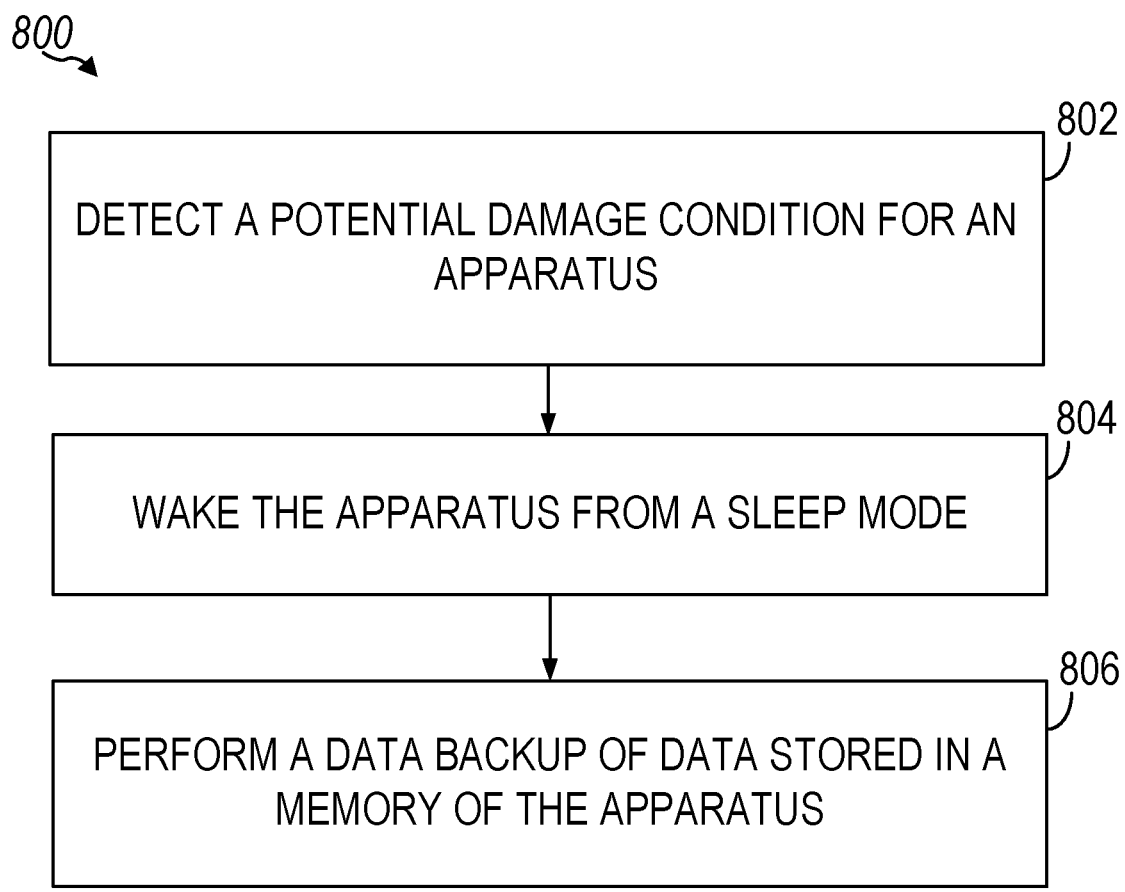
FIG. 8 is flow chart illustrating a method for automatic detection of a potential damage condition and backup of data in response to detection of the potential damage condition according to some embodiments of the disclosure.

FIG. 8 is flow chart illustrating a method 800 for automatic detection of a potential damage condition and backup of data in response to detection of the potential damage condition according to some embodiments of the disclosure. In some aspects, the method 800 may be performed by a processor of an electronic device, such as a smart phone, a laptop, a wearable, or another electronic device. The method 800 includes, at block 802, detecting a potential damage condition for an apparatus. Potential damage conditions of an apparatus may include a thermal damage condition, where a temperature of an apparatus exceeds a threshold temperature, a water damage condition, where a moisture level of an apparatus or barometric pressure of an apparatus exceeds a threshold level, an impact damage condition, such as when the apparatus is dropped, thrown, or otherwise impacts a hard surface, or another damage condition. Detection of potential damage conditions may, for example, include determining that a sensed parameter of the apparatus exceeds a threshold level. For example, a processor of the apparatus may receive data from one or more sensors of the apparatus. Based on the data received from the one or more sensors, the apparatus may detect a potential damage condition. The sensed parameter of the apparatus may include an a an acceleration parameter of the apparatus received from an accelerometer of the apparatus, a temperature parameter of the apparatus received from a thermal sensor of the apparatus, a moisture breach parameter of the apparatus received from a moisture sensor of the apparatus, a barometric pressure of the apparatus received from a barometric pressure sensor, or another parameter of the apparatus received from another sensor.

At block 804, the apparatus may be woken from a sleep mode. In some aspects, the apparatus may already be in a woken state and thus block 804 may be bypassed. Waking the apparatus from a sleep mode may, for example, be performed in response to detection of the potential damage condition prior to performing a data backup. Waking the apparatus from a sleep mode may, for example, include waking or initializing one or more subsystems of the apparatus required for performing a backup operation. As one example, waking the apparatus from the sleep mode may include activating one or more processing cores of an application processor, a modem, or another processor of the electronic device. Waking the apparatus may include copying an island image, tiny image, page only image, or sensor only image to a cache, such as an L2 cache of the electronic device associated with one or more subsystems of the electronic device, such as one or more processors or processing cores of the electronic device.

At block 806, a data backup of data stored in a memory of the apparatus may be performed. For example, such a backup may include copying data from a memory of the apparatus, such as a volatile memory of the apparatus, a cache of the apparatus, an SRAM a DDR RAM of the apparatus, a flash memory of the apparatus, or another memory of the apparatus, to a storage memory of the apparatus, such as to a flash memory of the apparatus. Copying the data to a storage memory of the apparatus may, for example, include copying the data to a dedicated backup partition of a flash memory of the apparatus. In some aspects, the memory from which data is being copied may comprise a DDR RAM of the apparatus and the storage memory of the apparatus to which data is being copied may comprise a UFS flash memory of the apparatus. As another example, such a backup may include copying data from a memory of the apparatus to a remote data storage, such as to a remote server. Thus, to perform the backup, the apparatus may transmit the data to be backed up via a wireless connection, such as a Wi-Fi connection, a cellular connection, or another wireless connection to a remote data storage device. In some aspects, the apparatus may both copy data to a storage memory of the apparatus and transmit data to a remote data storage device for remote storage of the data. In some aspects, the apparatus may copy certain categories of data to a storage memory of the apparatus and may transmit other categories of data to a remote data storage device for remote storage of the data based on one or more policies configured by a user, administrator, or other entity. In some aspects, the apparatus may determine whether to copy data to a storage memory of the apparatus, transmit the data to a remote data storage, or both, based on one or more factors, such as a policy configured by an administrator or user governing a destination of data backup, one or more characteristics of the detected potential damage condition, availability of a wireless network connection for transmission of data, availability of space on a local storage memory for copying of data, and other factors. In some aspects, if the apparatus determines that the detected potential damage condition was a false positive, such as based on input by a user or sensed data, the apparatus may cease to perform the backup and may free space occupied by the backed up data for storage of other data.

In some aspects, the data backup of block 806 may be performed based on a priority of data to be backed up. For example, different categories of data may be assigned different priority levels by a manufacturer, by a user, by an administrator, or by another entity. An order for performing a backup of different categories of data may be determined based on assigned priorities of the different categories of data. For example, in performing the backup, the apparatus may determine a plurality of respective priorities of a plurality of respective subsets of the data, such as a plurality of respective categories of the data, stored in the memory of the apparatus and may determine an order for performing a backup of each of the subsets of the data based on the determined plurality of respective priorities. In some aspects, such a determination may be made by a policy engine executed by the apparatus. In some aspects, such as when sufficient time is available, the apparatus may perform a full backup to a remote data storage device of all data stored by the apparatus.

Figure 9:
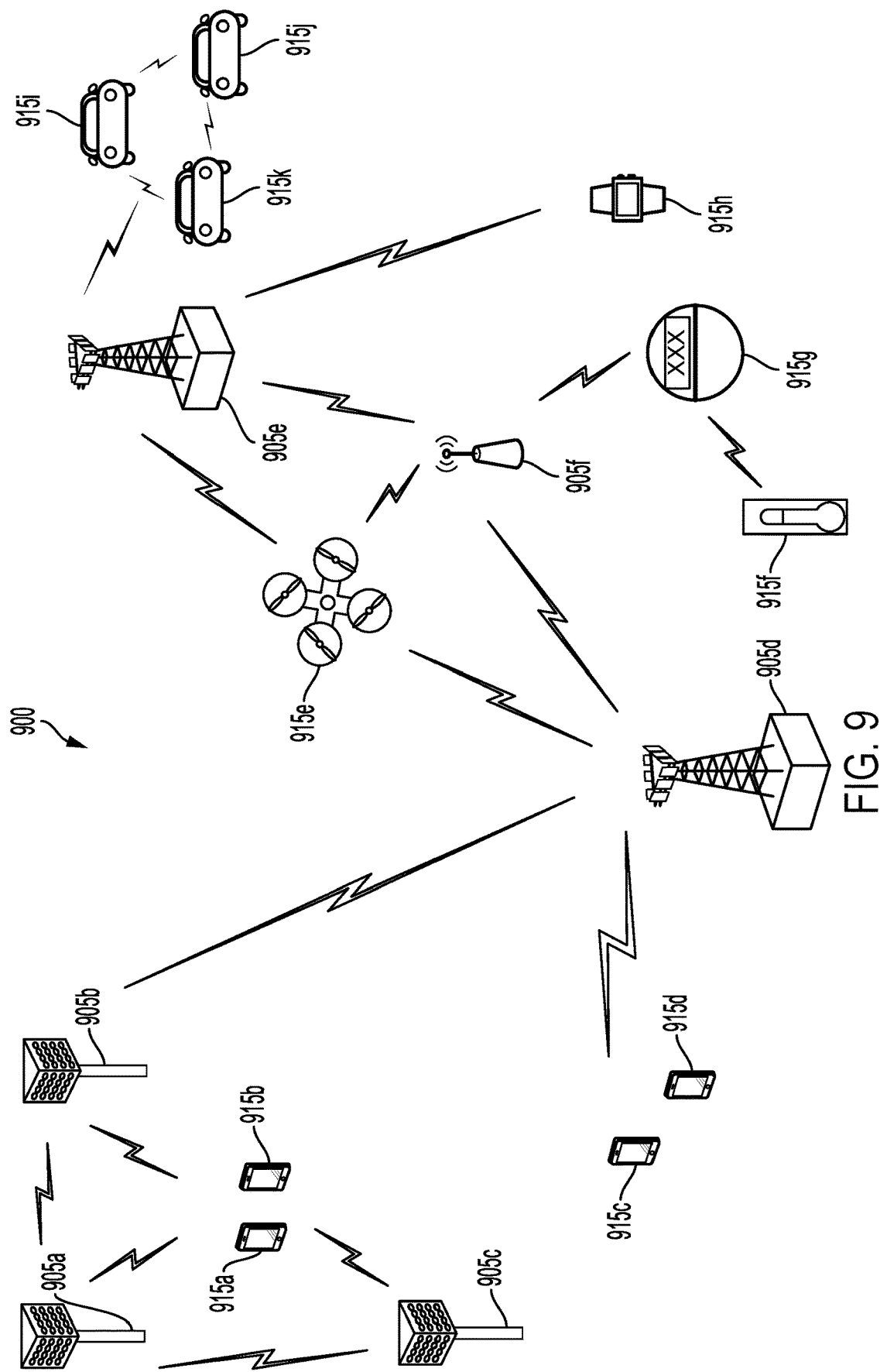
FIG. 9 is a block diagram illustrating details of an example wireless communication system according to one or more aspects.

Operations of method 800 may be performed by a UE, such as a UE described with reference to FIG. 9. For example, example operations (also referred to as "blocks") of method 800 may enable UE 915 to support greater user data confidentiality. FIG. 9 is a block diagram illustrating details of an example wireless communication system according to one or more aspects. The wireless communication system may include wireless network 900. Wireless network 900 may, for example, include a 5G wireless network. As appreciated by those skilled in the art, components appearing in FIG. 9 are likely to have related counterparts in other network arrangements including, for example, cellular-style network arrangements and non-cellular-style-network arrangements (e.g., device to device or peer to peer or ad hoc network arrangements, etc.).

Wireless network 900 illustrated in FIG. 9 includes a number of base stations 905 and other network entities. A base station may be a station that communicates with the UEs and may also be referred to as an evolved node B (eNB), a next generation eNB (gNB), an access point, and the like. Each base station 905 may provide communication coverage for a particular geographic area. In 3GPP, the term "cell" may refer to this particular geographic coverage area of a base station or a base station subsystem serving the coverage area, depending on the context in which the term is used. In implementations of wireless network 900 herein, base stations 905 may be associated with a same operator or different operators (e.g., wireless network 900 may include a plurality of operator wireless networks). Additionally, in implementations of wireless network 900 herein, base station 905 may provide wireless communications using one or more of the same frequencies (e.g., one or more frequency bands in licensed spectrum, unlicensed spectrum, or a combination thereof) as a neighboring cell. In some examples, an individual base station 905 or UE 915 may be operated by more than one network operating entity. In some other examples, each base station 905 and UE 915 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 9, base stations 905d and 905e are regular macro base stations, while base stations 905a-905c are macro base stations enabled with one of 3 dimension (3D), full dimension (FD), or massive MIMO. Base stations 905a-905c take advantage of their higher dimension MIMO capabilities to exploit 3D beamforming in both elevation and azimuth beamforming to increase coverage and capacity. Base station 905f is a small cell base station which may be a home node or portable access point. A base station may support one or multiple (e.g., two, three, four, and the like) cells.

Wireless network 900 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 915 are dispersed throughout the wireless network 900, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 915, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a flying device, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 915a-915d of the implementation illustrated in FIG. 9 are examples of mobile smart phone-type devices accessing wireless network 900. A UE may also be a machine specifically configured for connected communication, including machine type communication (MTC), enhanced MTC (eMTC), narrowband IoT (NB-IoT) and the like. UEs 915e-915k illustrated in FIG. 9 are examples of various machines configured for communication that access wireless network 900.

A mobile apparatus, such as UEs 915, may be able to communicate with any type of the base stations, whether macro base stations, pico base stations, femto base stations, relays, and the like. In FIG. 9, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 900 may occur using wired or wireless communication links.

In operation at wireless network 900, base stations 905a-905c serve UEs 915a and 915b using 3D beamforming and coordinated spatial techniques, such as coordinated multi-point (CoMP) or multi-connectivity. Macro base station 905d performs backhaul communications with base stations 905a-905c, as well as small cell, base station 905f. Macro base station 905d also transmits multicast services which are subscribed to and received by UEs 915c and 915d. Such multicast services may include mobile television or stream video, or may include other services for providing community information, such as weather emergencies or alerts, such as Amber alerts or gray alerts.

Wireless network 900 of implementations supports mission critical communications with ultra-reliable and redundant links for mission critical devices, such UE 915e, which is a aeronautical vehicle. Redundant communication links with UE 915e include from macro base stations 905d and 905e, as well as small cell base station 905f. Other machine type devices, such as UE 915f (thermometer), UE 915g (smart meter), and UE 915h (wearable device) may communicate through wireless network 900 either directly with base stations, such as small cell base station 905f, and macro base station 905e, or in multi-hop configurations by communicating with another user device which relays its information to the network, such as UE 915f communicating temperature measurement information to the smart meter, UE 915g, which is then reported to the network through small cell base station 905f. Wireless network 900 may also provide additional network efficiency through dynamic, low-latency TDD communications or low-latency FDD communications, such as in a vehicle-to-vehicle (V2V) mesh network between UEs 915i-915k communicating with macro base station 905c.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably. A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards. A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long-term evolution (LTE) is a release of UMTS that uses E-UTRA. The various different network types may use different radio access technologies (RATs) and RANS.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

In one or more aspects, techniques for supporting data storage and/or data transmission, may include additional aspects, such as any single aspect or any combination of aspects described below or in connection with one or more other processes or devices described elsewhere herein. In a first aspect, an electronic device, such as a UE, may be an apparatus including at least one memory and at least one processor. The at least one processor may be coupled to the memory and configured to perform operations comprising detecting a potential damage condition for the apparatus and, in response to detection of the potential damage condition for the apparatus, performing a data backup of data stored in the at least one memory of the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, the at least one processor is configured to detect the potential damage condition for the apparatus by performing operations comprising determining a sensed parameter of the apparatus exceeds a threshold level.

In a third aspect, in combination with one or more of the first aspect or the second aspect, the sensed parameter of the apparatus comprises at least one of: an acceleration parameter of the apparatus received from an accelerometer of the apparatus; a temperature parameter of the apparatus received from a thermal sensor of the apparatus; or a moisture breach parameter of the apparatus received from a moisture sensor of the apparatus.

In a fourth aspect, in combination with one or more of the first aspect through the third aspect, to perform the data backup of data stored in the at least one memory of the apparatus, the at least one processor is further configured to perform operations comprising transmitting the data to a remote data storage device.

In a fifth aspect, in combination with one or more of the first aspect through the fourth aspect, to perform the data backup of data stored in the at least one memory of the apparatus, the at least one processor is further configured to perform operations comprising copying the data to a flash memory of the apparatus.

In a sixth aspect, in combination with one or more of the first aspect through the fifth aspect, to copy the data to a flash memory of the apparatus, the at least one processor is further configured to perform operations comprising copying the data to a dedicated backup partition of the flash memory of the apparatus.

In a seventh aspect, in combination with one or more of the first aspect through the sixth aspect, the at least one memory comprises double data rate (DDR) random access memory (RAM) and the flash memory comprises a universal flash storage (UFS) memory of the apparatus.

In an eighth aspect, in combination with one or more of the first aspect through the seventh aspect, to perform the data backup of data stored in the at least one memory of the apparatus the at least one processor is further configured to perform operations comprising: determining a plurality of priorities of a plurality of subsets of the data stored in the at least one memory of the apparatus; and determining an order for performing a backup of each of the subsets of the data stored in the at least one memory of the apparatus based on the determined plurality of priorities.

In a ninth aspect, in combination with one or more of the first aspect through the eighth aspect, a method includes the at least one processor is further configured to perform operations comprising: waking the apparatus from a sleep mode in response to detection of the potential damage condition for the apparatus prior to performing the data backup.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-3 and 9 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art that one or more blocks (or operations) described with reference to FIGS. 4-8 may be combined with one or more blocks (or operations) described with reference to another of the figures. For example, one or more blocks (or operations) of FIG. 1 may be combined with one or more blocks (or operations) of FIG. 3. As another example, one or more blocks associated with FIG. 1 may be combined with one or more blocks (or operations) associated with FIGS. 4-8. Additionally, or alternatively, one or more operations described above with reference to FIGS. 1-3 and 9 may be combined with one or more operations described with reference to FIGS. 4-8.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, opposing terms such as "upper" and "lower" or "front" and back" or "top" and "bottom" or "forward" and "backward" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A. B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus, comprising:
   at least one memory; and
   at least one processor coupled to the memory, wherein the at least one processor is configured to perform operations comprising:
   detecting a potential damage condition for the apparatus;
   waking one or more islands of the apparatus from a sleep state in response to detection of the potential damage condition for the apparatus prior to performing a data backup; and
   in response to detection of the potential damage condition for the apparatus, performing, using the one or more islands of the apparatus, the data backup of data stored in the at least one memory of the apparatus to a remote data storage device or to a flash memory of the apparatus based on a type of the potential damage condition.

2. The apparatus of claim 1, wherein to detect the potential damage condition for the apparatus, the at least one processor is further configured to perform operations comprising determining a sensed parameter of the apparatus exceeds a threshold level.

3. The apparatus of claim 2, wherein the sensed parameter of the apparatus comprises at least one of:
   an acceleration parameter of the apparatus received from an accelerometer of the apparatus;
   a temperature parameter of the apparatus received from a thermal sensor of the apparatus; or
   a moisture breach parameter of the apparatus received from a moisture sensor of the apparatus.

4. The apparatus of claim 1, wherein to perform the data backup of data stored in the at least one memory of the apparatus, the at least one processor is further configured to perform operations comprising transmitting the data to the remote data storage device based on a type of the potential damage condition being a thermal type or a water exposure type.

5. The apparatus of claim 1, wherein to perform the data backup of data stored in the at least one memory of the apparatus, the at least one processor is further configured to perform operations comprising copying the data to the flash memory of the apparatus based on a type of the potential damage condition being a drop type or an impact type.

6. The apparatus of claim 5, wherein to copy the data to the flash memory of the apparatus, the at least one processor is further configured to perform operations comprising copying the data to a dedicated backup partition of the flash memory of the apparatus.

7. The apparatus of claim 6, wherein the at least one memory comprises double data rate (DDR) random access memory (RAM) and the flash memory comprises a universal flash storage (UFS) memory of the apparatus.

8. The apparatus of claim 1, wherein to perform the data backup of data stored in the at least one memory of the apparatus the at least one processor is further configured to perform operations comprising:
   determining a plurality of priorities of a plurality of subsets of the data stored in the at least one memory of the apparatus; and
   determining an order for performing a backup of each of the subsets of the data stored in the at least one memory of the apparatus based on the determined plurality of priorities.

9. The apparatus of claim 1, wherein waking the one or more islands of the apparatus comprises copying binary island data from a double data rate random access memory of the apparatus to an L2 cache of the apparatus for performing the data backup.

10. A method, comprising:
    detecting, by at least one processor of an apparatus, a potential damage condition for the apparatus;
    waking one or more islands of the apparatus from a sleep state in response to detection of the potential damage condition for the apparatus prior to performing a data backup; and
    in response to detection of the potential damage condition for the apparatus, performing, by the at least one processor of the apparatus using the one or more islands of the apparatus, the data backup of data stored in at least one memory of the apparatus to a remote data storage device or to a flash memory of the apparatus based on a type of the potential damage condition.

11. The method of claim 10, wherein detecting the potential damage condition for the apparatus comprises determining a sensed parameter of the apparatus exceeds a threshold level.

12. The method of claim 11, wherein the sensed parameter of the apparatus comprises at least one of:
an acceleration parameter of the apparatus received from an accelerometer of the apparatus;
a temperature parameter of the apparatus received from a thermal sensor of the apparatus; or
a moisture breach parameter of the apparatus received from a moisture sensor of the apparatus.

13. The method of claim 10, wherein performing the data backup of data stored in the at least one memory of the apparatus comprises transmitting the data to the remote data storage device based on a type of the potential damage condition being a thermal type or a water exposure type.

14. The method of claim 10, wherein performing the data backup of data stored in the at least one memory of the apparatus comprises copying the data to the flash memory of the apparatus based on a type of the potential damage condition being a drop type or an impact type.

15. The method of claim 14, wherein copying the data to the flash memory of the apparatus comprises copying the data to a dedicated backup partition of the flash memory of the apparatus.

16. The method of claim 15, wherein the at least one memory comprises double data rate (DDR) random access memory (RAM) and the flash memory comprises a universal flash storage (UFS) memory of the apparatus.

17. The method of claim 10, wherein performing the data backup of data stored in the at least one memory of the apparatus comprises:
determining a plurality of priorities of a plurality of subsets of the data stored in the at least one memory of the apparatus; and
determining an order for performing a backup of each of the subsets of the data stored in the at least one memory of the apparatus based on the determined plurality of priorities.

18. The method of claim 10, wherein waking the one or more islands of the apparatus comprises copying binary island data from a double data rate random access memory of the apparatus to an L2 cache of the apparatus for performing the data.

19. A non-transitory computer-readable medium storing instructions that, when executed by at least one processor, cause the at least one processor to perform operations comprising:
detecting a potential damage condition for an apparatus;
waking one or more islands of the apparatus from a sleep state in response to detection of the potential damage condition for the apparatus prior to performing a data backup; and
in response to detection of the potential damage condition for the apparatus, performing, using the one or more islands of the apparatus, the data backup of data stored in at least one memory of the apparatus to a remote data storage device or to a flash memory of the apparatus based on a type of the potential damage condition.

20. The non-transitory computer-readable medium of claim 19, wherein detecting the potential damage condition for the apparatus comprises determining a sensed parameter of the apparatus exceeds a threshold level.

21. The non-transitory computer-readable medium of claim 20, wherein the sensed parameter of the apparatus comprises at least one of:
an acceleration parameter of the apparatus received from an accelerometer of the apparatus;
a temperature parameter of the apparatus received from a thermal sensor of the apparatus; or
a moisture breach parameter of the apparatus received from a moisture sensor of the apparatus.

22. The non-transitory computer-readable medium of claim 19, wherein performing the data backup of data stored in the at least one memory of the apparatus comprises transmitting the data to the remote data storage device based on a type of the potential damage condition being a thermal type or a water exposure type.

23. The non-transitory computer-readable medium of claim 19, wherein performing the data backup of data stored in the at least one memory of the apparatus comprises copying the data to the flash memory of the apparatus based on a type of the potential damage condition being a drop type or an impact type.

24. The non-transitory computer-readable medium of claim 23, wherein copying the data to the flash memory of the apparatus comprises copying the data to a dedicated backup partition of the flash memory of the apparatus.

25. An apparatus, comprising:
means for detecting a potential damage condition for the apparatus;
means for waking one or more islands of the apparatus from a sleep state in response to detection of the potential damage condition for the apparatus prior to performing a data backup; and
means for performing, in response to detection of the potential damage condition for the apparatus using the one or more islands of the apparatus, the data backup of data stored in at least one memory of the apparatus to a remote data storage device or to a flash memory of the apparatus based on a type of the potential damage condition.

26. The apparatus of claim 25, wherein the means for detecting the potential damage condition for the apparatus comprises means for determining a sensed parameter of the apparatus exceeds a threshold level.

27. The apparatus of claim 26, wherein the sensed parameter of the apparatus comprises at least one of:
an acceleration parameter of the apparatus received from an accelerometer of the apparatus;
a temperature parameter of the apparatus received from a thermal sensor of the apparatus; or
a moisture breach parameter of the apparatus received from a moisture sensor of the apparatus.

28. The apparatus of claim 25, wherein the means for performing the data backup of data stored in the at least one memory of the apparatus comprises means for transmitting the data to the remote data storage device based on a type of the potential damage condition being a thermal type or a water exposure type.

29. The apparatus of claim 25, wherein the means for performing the data backup of data stored in the at least one memory of the apparatus comprises means for copying the data to the flash memory of the apparatus based on a type of the potential damage condition being a drop type or an impact type.

30. The apparatus of claim 29, wherein the means for copying the data to the flash memory of the apparatus comprises means for copying the data to a dedicated backup partition of the flash memory of the apparatus.

* * * * *